United States Patent [19]
Rutkowski et al.

[11] 3,940,568
[45] Feb. 24, 1976

[54] CIRCUIT ARRANGEMENT FOR TELEPHONE EXCHANGE INSTALLATIONS WITH CENTRAL CONTROL MEANS AND A PLURALITY OF INDIVIDUAL APPARATUSES HAVING A COMMON INFORMATION COMMUNICATION LINE CONNECTING THE INDIVIDUAL APPARATUS TO THE CENTRAL CONTROL MEANS

[75] Inventors: Karl Rutkowski, Pullach; Helmuth-Joachim Bock, Munich; Peter Gerke, Grafelfing, all of Germany

[73] Assignee: Siemens Aktiengesellschaft, Berlin and Munich, Germany

[22] Filed: Feb. 3, 1971

[21] Appl. No.: 112,224

Related U.S. Application Data
[63] Continuation-in-part of Ser. No. 780,461, Dec. 2, 1968, abandoned.

[52] U.S. Cl. .......................................... 179/18 ES
[51] Int. Cl.[2] .......................................... H04Q 3/54
[58] Field of Search ............................. 179/18 ES

[56] References Cited
UNITED STATES PATENTS

| | | | |
|---|---|---|---|
| 3,281,539 | 10/1966 | Dunlap et al. ...................... | 179/18 J |
| 3,403,383 | 9/1968 | Kienzle et al. .............. | 179/18 ES X |
| 3,420,957 | 1/1969 | Ulrich .............................. | 179/18 ES |
| 3,478,173 | 11/1969 | Lapsevskis et al. ............. | 179/18 ES |
| 3,558,829 | 1/1971 | Aro et al. ......................... | 179/18 ES |

FOREIGN PATENTS OR APPLICATIONS

| | | | |
|---|---|---|---|
| 1,054,785 | 1/1967 | United Kingdom ............. | 179/18 ES |
| 1,059,672 | 2/1967 | United Kingdom ............. | 179/18 ES |

*Primary Examiner*—Thomas W. Brown

[57] ABSTRACT

A circuit arrangement for long distance telephone communication installations having a central apparatus comprising a central control unit and individual apparatus of different types; for example, internal connection sets, long distance line repeaters, exchange office repeaters in subscriber installations with extension stations, registers, dial receivers and the like. Correspondingly different information, for example dial impulse series, control criteria and the like are exchanged between the central control unit and the individual apparatus. Messages of different information content are transmitted by the same information signals by means of address information added to said signals. The address identifies a specific type of individual apparatus, and the evaluation of that address provides the correct interpretation of the information.

3 Claims, 6 Drawing Figures

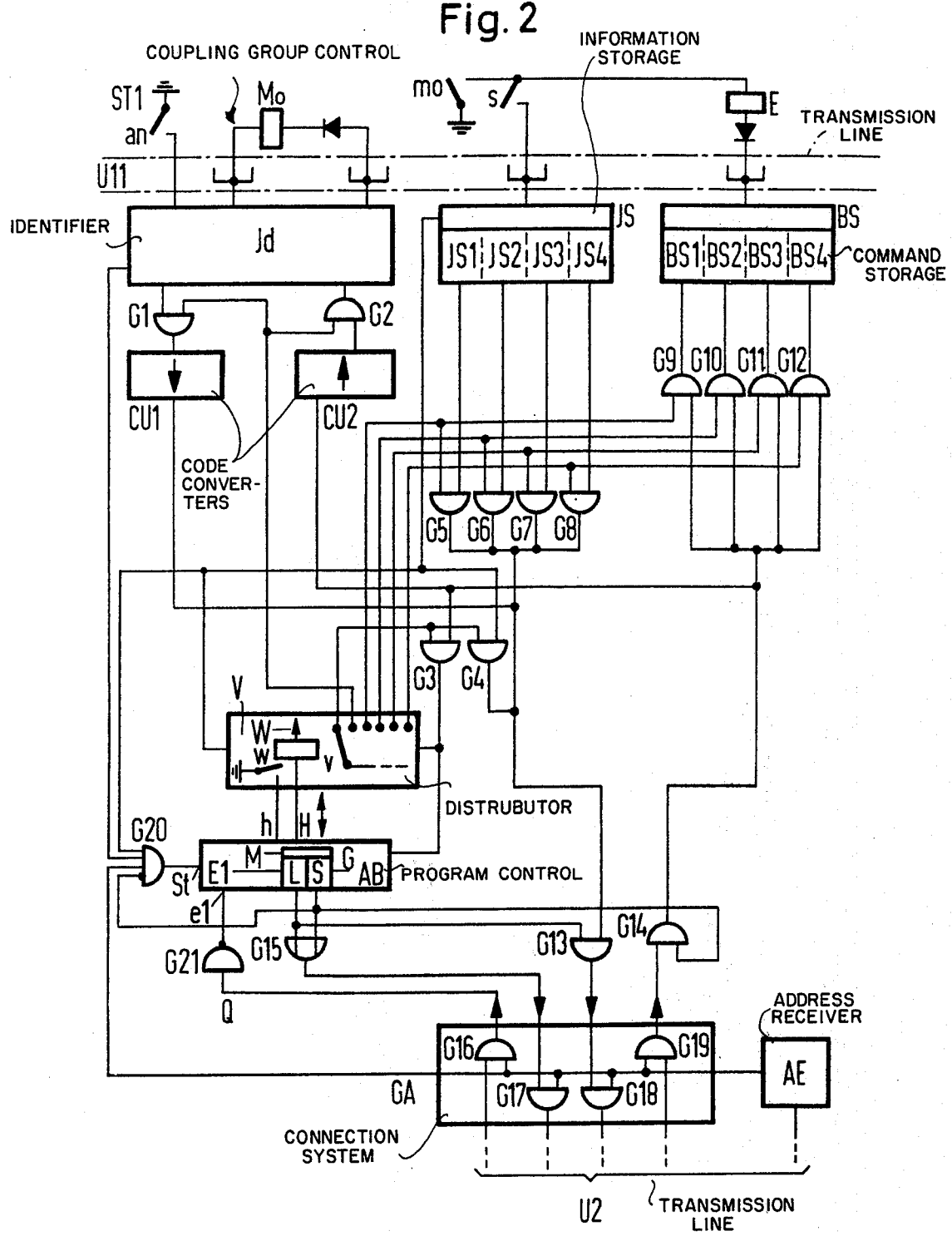

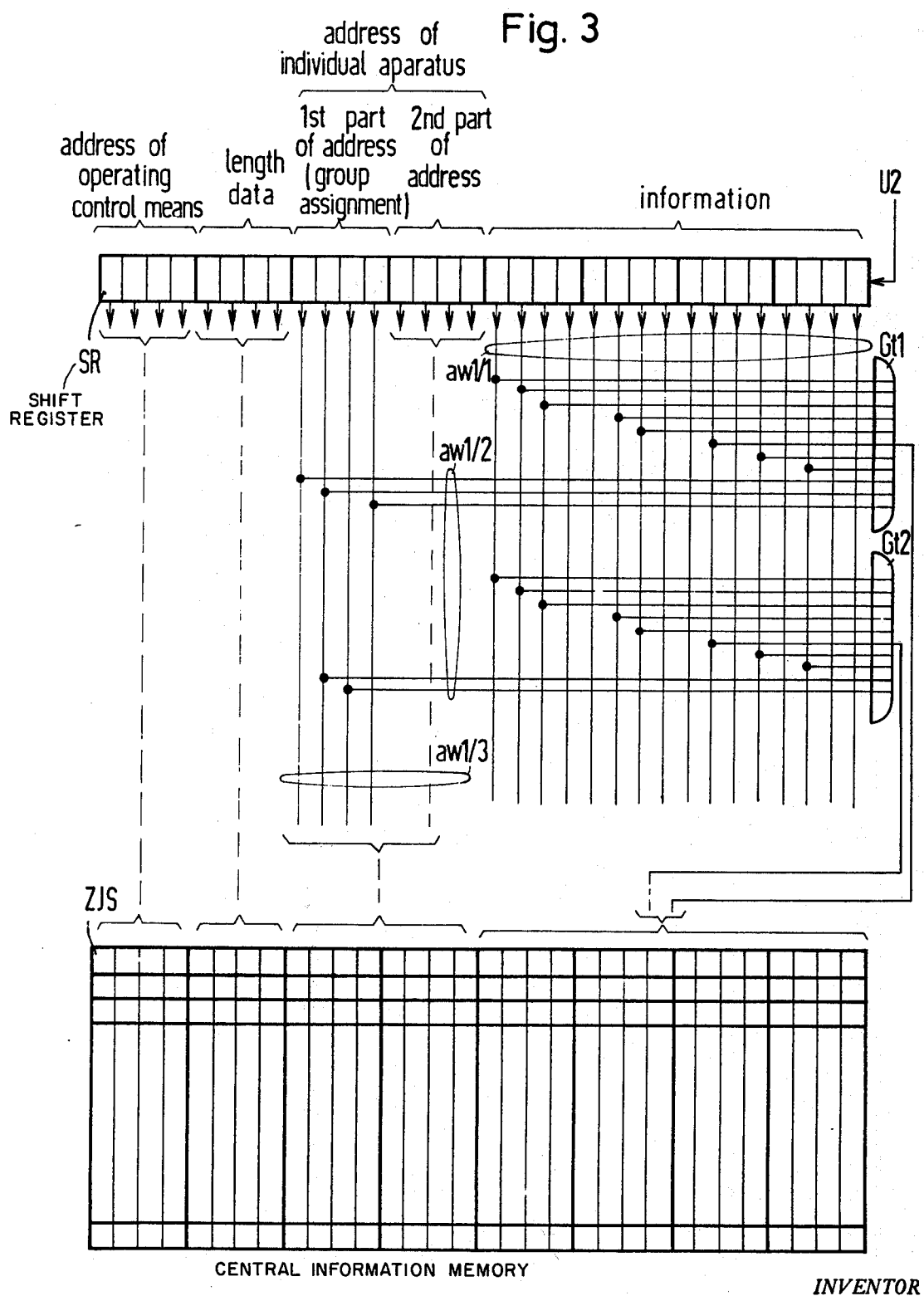

CIRCUIT ARRANGEMENT FOR TELEPHONE EXCHANGE INSTALLATIONS WITH CENTRAL CONTROL MEANS AND A PLURALITY OF INDIVIDUAL APPARATUSES HAVING A COMMON INFORMATION COMMUNICATION LINE CONNECTING THE INDIVIDUAL APPARATUS TO THE CENTRAL CONTROL MEANS

CROSS REFERENCE TO RELATED APPLICATION

This application is a continuation in part of copending U.S. application Ser. No. 780,461, filed Dec. 2, 1968, now abandoned.

BACKGROUND OF THE INVENTION

1. Field of the Invention

The invention concerns a circuit arrangement for telephone communication installations. The latter comprises a central control unit and individual apparatus of different types; for example, internal connection sets, long distance line repeaters, exchange office repeaters in subscriber installations with extension stations, registers, dial receivers and the like. Correspondingly, different information and different types of information, for example dial impulse series, control signals and the like are exchanged between the central control unit and the individual apparatus.

2. Description of the Prior Art

In recent times many exchange installations of this type having central control means, e.g., special purpose control computers, have become known in the telephone art. To a plurality of individual apparatuses there is assigned a common apparatus, also designated as central control unit, which exchanges information with the individual apparatuses and carries out the largest part of the logical information processing for these apparatuses. Due to this centralization of the logical function of an exchange installation, the total expenditures therefore, may, as is known, be considerably increased. However, changes in the mode of functioning can advantageously be made in exchange installations of this type as appropriate circuitry changes need only be made at the central location.

Thus, circuitry requirements are to a great extent centralized in centrally controlled exchange installations. The individual apparatuses are developed in such a way that they require the least possible expenditures. Their operating speed is also relatively low, because of the circuit conditions of lines and to switching devices included in connections. In contrast, the central control means has a very much higher operating speed, as it must work with all of the individual apparatuses in succession. Even the extent of its operational range depends on its operating speed; the faster its functional programs are carried out, the more individual apparatus can be served by a single central control means.

The time requirements for each functional program of the central control means include information reception, logical information processing, and information transmission. To speed up the functional programs of a central control unit, only the time requirement for the information processing can be restricted, if it is equipped with appropriately fast working switching devices. However, the time requirement for information reception and transmission depends on those of the individual apparatuses with which the central control means is, at the time, exchanging information. To reduce the time requirements for the functional programs of the central control unit there have, therefore, previously been provided buffer stores between it and the individual apparatus with which exchanges of information are carried out.

With regard to the above, reference is made to U.S. Pat. No. 3,113,184. In this patent the individual apparatus consists of coupling groups of a switching matrix. To each coupling group one buffer store each is assigned. Two types of coupling groups are provided, i.e., subscriber coupling groups and connection line coupling groups. Accordingly, two types of information collector lines are provided between the buffer stores and the central control means. Depending on their assignment to subscriber coupling groups or to connection line coupling groups, the buffer stores are connectable to one of two information collector lines with the aid of gate circuits individually assigned to the buffer stores. These gate circuits are corresponding to the two types of coupling groups controllable from the direction of the central control unit over two separate multiple control lines which are provided in addition to the information collector lines, so that in each case only a single buffer store is connectible to the information collector line leading to the central control.

A prominent characteristic of the known arrangement thus resides in the fact that the address of the individual apparatus to be connected in each case to the central control unit lies in a control command transmitted by the central control unit over the multiple control line. The type of the individual apparatus in question is expressed, not in its address, but in the use of the multiple control line and information collector line in each case, over which the information transmission is prepared and carried out.

It must also be considered that the further individual apparatus in the known arrangement, i.e., subscriber line circuits (subscriber circuits), connection line circuits (connection sets for internal and external connections) and announcement registers (customary dial receiving registers), contain storage means, as the central control unit cannot receive arbitrarily the information collecting therein, but it must also control the information exchange with these individual apparatuses so that it can be carried out gradually. It must further be assumed as a matter of course that just as the switching matrix is developed of many individual apparatuses (coupling groups), there are also provided several connection sets each for internal and external connections, several registers each, etc. Thus for these individual apparatuses too the previously stated principle that in the known arrangement the address of the individual apparatus to be connected in each case to the central control unit lies in a control command transmitted by the central control unit over the control multiple line, whereas the type of the individual apparatus in question is expressed not in its address, but in the use of the multiple control line and information collector line in each case, over which the information transmission is prepared and carried out.

The individual apparatuses are, among others, those from which the central control unit must receive information, which differs not only in the address of the individual apparatus from which they originate, but also in their type; for example, there are offered to the central control unit on one hand by registers - dial signals, and on the other hand, by connection sets - line signals received therein. Such different information is distinguishable with regard to the specimen of the individual message, in each case by its address, but with regard to its specific type (connection set, register) only with the aid of the specific multiple information. Thus, in the known arrangement several multiples of information are required for the central control unit so that it can distinguish the various types.

SUMMARY OF THE INVENTION

The problem is thus presented to restrict the requirements for storage and connection devices between the central control unit and the individual apparatus and to standardize them according to types, in order to increase directly, as well as by reason of an extensive compatibility of these devices, their degree of utility.

This and other objects are achieved in this invention through the fact that there is provided for information exchange, a central information line proceeding from the central apparatus to the individual apparatus of different types, and that addresses of the individual apparatus of an installation which serve for the individual connection of the individual apparatus to the central information line are arranged in groups. Further, there are transmittable over the central information line, different messages (information contents) by the same data signals, through the fact that by reason of the address added to each data signal, not only its assignment to the individual apparatus in each case in recognizable to the central apparatus, but also, corresponding to which group the address pertains, the specific type of information may be determined.

Thus, according to the invention, a common apparatus information line serves for the information exchange with the different individual apparatuses. Messages from different types of individual apparatus are transmitted over the common information line. Because these messages emanate from different types of individual apparatus, the messages themselves are divided into equally different types of messages. These messages of different types can, however, be expressed by like information. In the prior art installations different information lines were provided so that information from the various types of individual apparatus could be distinguished. The invention contemplates providing an address whereby the sources of various messages can be determined. This address indicates, inter alia, from which type of individual apparatus the information came from, and the address is used to determine the interpretation to be given the message in central control. The address can be determined in different ways and communicated to the central control. For example, a scanning system (scanner) can be provided which scans, in succession, all individual apparatus as to whether there exists the necessity for a connection of the individual apparatus to the central contol unit and, if so, transmits the address of the individual apparatus to the central control unit.

On the other hand, it also is possible to provide an identification means which receives connection stimuli from the individual apparatus, makes a selection among possibly several, and transmits the address of the selected individual apparatus to the central control unit. It is also possible to carry out the connection of the individual apparatus to the central control unit in a different manner and after such a connection to always cause the individual apparatus in question to first transmit its address to the central control unit over the information line. It is possible, as well, to provide an identification means in several connection systems, and to subject the several connection systems, of which each is assigned to a group of individual apparatus of different types, to a cyclic test through a scanning system assigned to the central apparatus. In this case, the address of the individual apparatus is formed in the connection system and is transmitted to the central control unit together with the information.

But, no matter how the address of the individual apparatus is determined and transmitted to the central control unit, the latter not only receives the address in order to retain the assignment of information to a certain individual apparatus, but it additionally evaluates the address so that it can be ascertained from its group assignment of which nature the message received in each case is, i.e., in what manner the corresponding information is to be interpreted. For this no special pre-information need be introduced, but, by reason of the group assignment of the addresses these can be co-utilized as means of information distinction.

The difference in the messages is not limited to their characters, but it can also refer to differences in form, for example, non-coded signals, decade and binary coded signals and the like.

BRIEF DESCRIPTION OF THE DRAWINGS

FIG. 1 comprising

FIG. 2 is a circuit diagram in which the operating matrix control means of FIG. 1 is shown in greater detail;

FIG. 3 is a diagrammatic representation of the major elements of the central control unit illustrated in the FIG. 1 embodiment.

DETAILED DESCRIPTION OF THE INVENTION

Figure 1A:
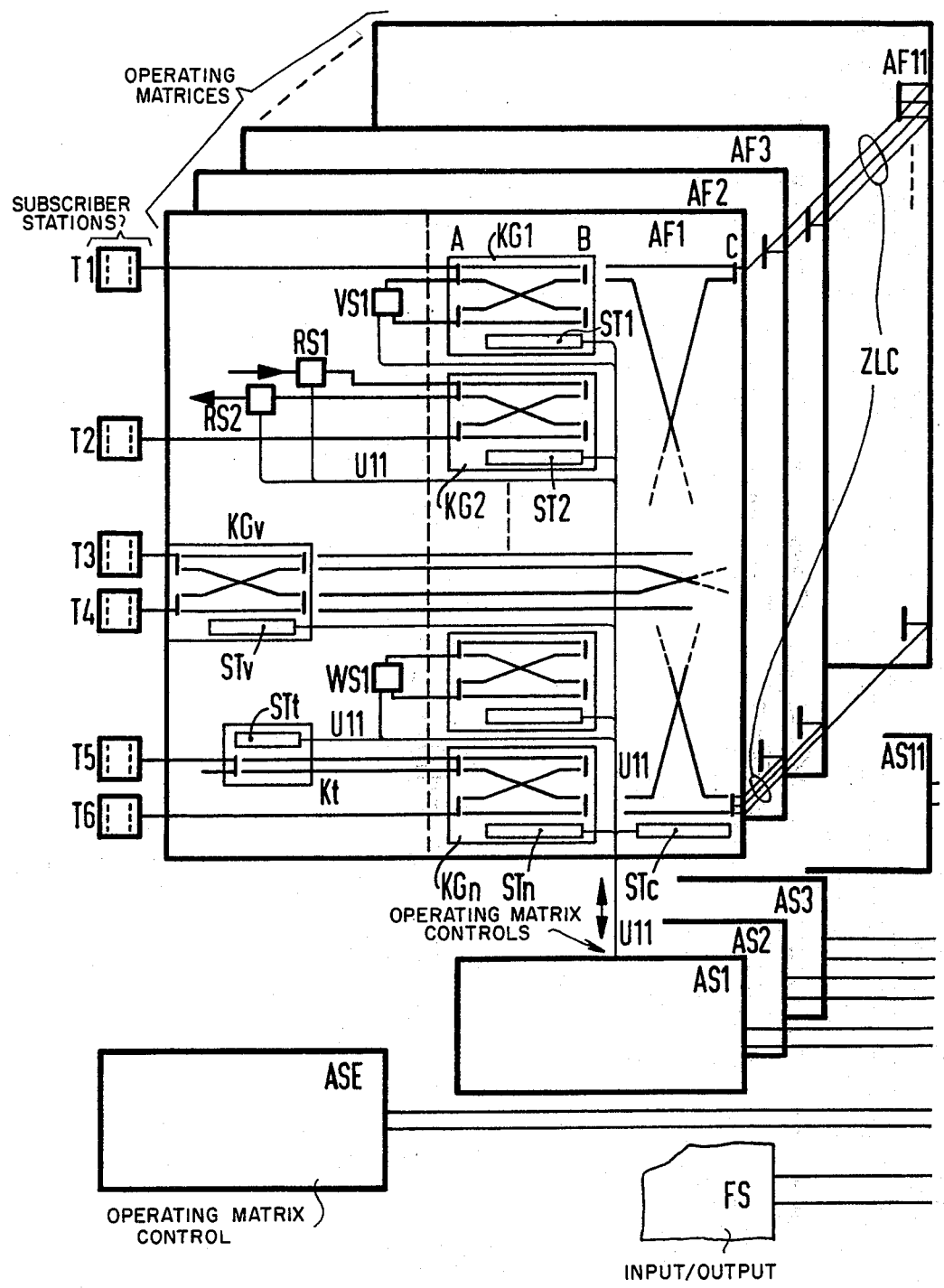
FIGS. 1a and 1b is a block diagram of a preferred embodiment of a telephone exchange according to the invention.
Figure 1B:
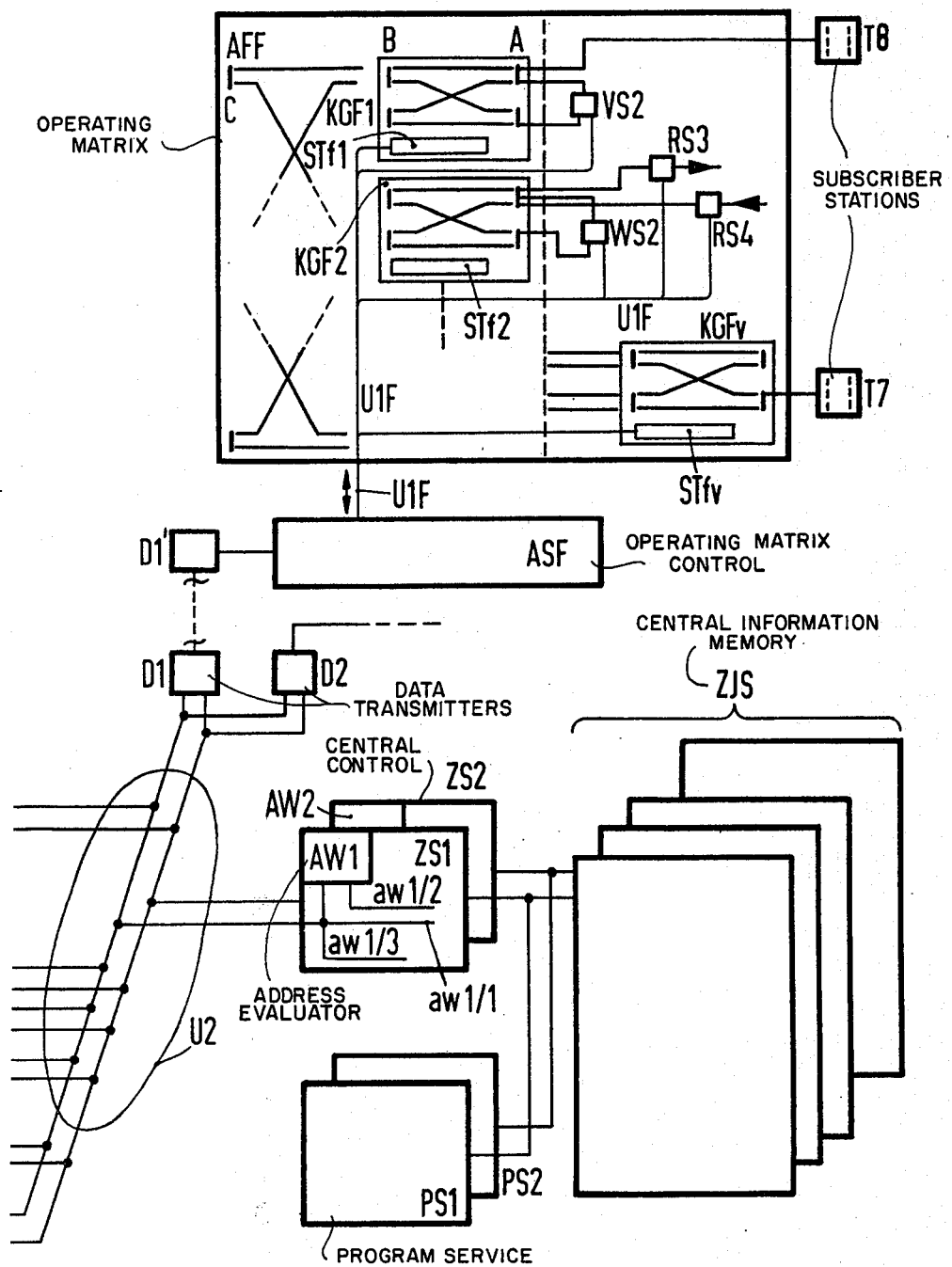

FIG. 1 shows a general view of a telephone exchange installation according to the invention. Several groups AF1 to AF11, AFF, etc., of individual apparatus are shown. These groups are designated in the following, as operating matrices. Further, there are individually assigned connection systems to the operating matrices which are designated in the following as operating matrix control means, e.g., metrix control AS1 is assigned to AF1 and matrix control ASF is assigned to AFF, etc. They control, inter alia, the connection of individual apparatus, for example, ST1, RS1, VS1, etc., to a transmission line of a first type U11, which jointly with a transmission line of a second type U2, represents the described central information line. Differently designated lines are needed to accommodate the several operating matrix controls and the branches extending therefrom.

The operating matrix control means AS1 to AS11 of the exchange installation are connected over transmission lines of the second type U2 (which represents a part of the previously mentioned information line) with two central apparatuses, i.e., the central control units ZS1 and ZS2. The arrangement of two central control units, operating in parallel fashion, serves in known manner to increase the operating reliability of the entire exchange system with regard to the possibility of a mulfunction or operational interruption of a central control unit as well as to check errors by comparing two information supplied independently from one another by two different central control units. As this is not essential for the understanding of the invention, one single central control unit is generally discussed in the following.

The part of the central information line formed by transmission line U2 is connected to the central control unit (ZS1 and ZS2). Thus, the individual apparatus and the central control unit are in connection over a central information line. This information line proceeds over the operating matrix control means which, inter alia, contains a conventional intermediate storage and code converter system. The central information line is divided through the operating matrix control means into a transmission line of the first type U11 and a transmission line of the second type U2.

The operating matrix control means also serves, among other things, for the determination of the address of an individual apparatus which preceeds the information in an information transmission to the central control unit. This address designates the point of origin, i.e., a specific individual apparatus of an information, to which it refers and must continue to refer for accurate logical processing by the central control unit. The central control unit must know, for example, from which the several dial sets, for example WS1, dial information has arrived, so that the right subscriber receives the correct connection dialed by him.

Information arriving in the central control unit over transmission line U2 of the second type is thus always accompanied by an address. The information contains messages of different kinds, depending on from what kind of individual apparatus it originates. The kinds of apparatus will be described later in more detail. Different messages can in part be transmitted by means of similar information. In order that they can be distinguished and that no additional differentiation criteria need be added to the transmitted information, in the first place the addresses of the individual apparatus are divided into address groups according to the types of different individual apparatus, and secondly the central control unit, for example ZS1 is equipped with an address evaluator, for example AW1. This evaluator is not for the reception of the addresses of the individual apparatus added to the information, but only to recognize their group assignment.

The information can be distinguished regarding their type not only by the character of the message, for example, dialed digits or line signals, but also by their form, for example non-coded or decade or binary coded signals. Both of these differences are recognized by the central control, for example ZS1, with the aid of an evaluator, for example, AW1, from the address. The central control unit ZS1 obtains a signal as to the nature of the received message over circuit aw½, receives the information transmitting the message over circuit aw1/1 and the address of the individual apparatus added to the information over circuit aw⁻.

The central control device ZS1 is represented in further detail in FIG. 3 and is described only insofar as further description will contribute to a better understanding of the invention. Insofar as further structural or operating details are required, reference may be had to the November 1958 issue of *Bell System Technical Journal*, pages 1,342 through 1,382, and the September 1964 issue of the same publication at pages 2,055 through 2,096.

The information received in the central control device over the transmission line of the second type U2 are, as will be explained in further detail below, supplemented by a length indication and an address of the given individual apparatus. Each information in conjunction with the length indication and the address will then be received in a shift register and further supplemented by a prefixed address of the pertinent operating matrix control device. The address of the pertinent individual apparatus prefixed to each information is comprised of two parts. A first part contains an indication of the special type of the given individual apparatus, i.e., about the special address group. A second part contains, for example, the number identifying the given individual apparatus with this group. The information received in the shift register SR of the central control device ZS1, together with the length indication and address of the individual apparatus, will be thereafter routed to the central information memory (information storage) ZJS, which has a number of memory rows, shown horizontally in FIG. 3, and indeed, a memory row is available for each information to be stored. The central information memory ZJS is subdivided in a plurality of sections corresponding to the component parts explained above in detail (address of the operating matrix control device, length indication, address of the individual apparatus in two parts, information in four parts) in the same way as in the shift register SR.

With the transfer of information contained in the shift register SR along with addresses and length indication to the central information memory ZJS, one part of the address of the individual apparatus, and indeed, that part which designates the address group, or which characterizes its special type, will be evaluated therewith, for deriving the pertinent information. FIG. 3 shows that two identical data signals given off by the shift register SR arrive at different individual apparatuses as distinguishable data signals over the output of the coincidence gates Gt1 and Gt2 at the central information memory ZJS, because of different addresses of their type.

In the course of the further description, the circuit details of an exchange installation according to the invention insofar as they are shown in the drawings, are described in detail. Preparatorily it shall be pointed out that in addition to the addresses of individual apparatus which are divided into several groups depending on the type of the individual apparatus, there are also provided addresses of the operating matrix control means which must not be confused with the first mentioned addresses. These addresses of the operating field control units have no direct relation to the invention.

FIG. 1 shows a telephone exchange installation according to the invention having a plurality of groups of individual apparatuses comprising operating matrices AF1...AF11, and AFF which are part of a larger exchange installation. Each operating matrix comprises a group of spatially combined individual apparatus having assigned joint operating matrix control means. Intermediate storage and recording systems AS1...AS11 comprise operating matrix control means for operating matrices AF1...AF11, respectively. The operating matrix control means AS1...AS11 of the exchange installation are connected by transmission lines U2 of the second type with first and second central control means ZS1 and ZS2, respectively. The arrangement of the two central control means serves, in known manner, to increase the operational reliability of the entire exchange installations with regard to the possibility of a malfunction or an interruption of the operation of a central control means. It also functions to supervise errors by comparing two informations supplied independently of one another by the two different central control means. As this is not essential for understanding the invention, a single central control means is usually discussed hereafter.

First data transmission apparatuses D1, D2,..., are also connected to transmission lines U2. In each case these form with second individually assigned data apparatuses D1', D2',..., respectively and a corresponding connection line, data transmission paths which individually make it possible for distant operating matrices, for example AFF, to exchange information with central control means ZS1 and ZS2. Data apparatus D2 thus pertains to a second data transmission path and a further (not shown) distant operating matrix. Moreover, it is also possible to provide a common data path for several operating matrices located at the same distant location. Such devices are known in the prior art and will not be further discussed here.

The operating matrices each comprise, inter alia, coupling stages A and B of the three-stage switching matrix having coupling groups consisting of individual coordinate couplers, for example KG1 to KGn in the instance of operating matrix AF1 and KGF1, KGF2...,. in the instance of distant operating matrix AFF. To each coupling group an individual control means, for example ST1 in the instance of coupling group KG1, is assigned, and it carries out the setting orders received from the operating matrix control means. In each case, one coupling group and its assigned individual control means constitutes an individual apparatus. Further, the entirety of the couplers of coupling stage C with its control means STc are individual apparatus.

It is also possible to combine these couplers in an operating matrix in several individual apparatus having individual control means. Further, connection sets, for example VS1, for connections to be switchedthrough within the exchange installation consisting of operating matrices AF1 to AF11, are individual apparatus. Relay sets, for example RS1 and RS2, are individually assigned by connection lines (local and long distance lines) to exchange installations at other locations for arriving and/or departing connections. The individual apparatus also includes dial receivers, for example WS1, which serve subscribers for reception of dial information signals; preferred coupling groups, for example KGv having individual control means STv; and preferred one-stage couplers, for example Kt, having individual control means STt. These preferred coupling groups and one-stage couplers are of an importance which corresponds to the larger and smaller dial star switches known in customary exchange installations. Moreover, not shown individual subscriber connection circuits can be arranged as individual apparatus or in groups.

All of these individual apparatuses of an operating matrix for example AF1, are connected over a network of transmission lines of the first type, for example U11, with the operating matrix control means in question, for example AS1. The transmission lines of the first type represent, together with the above mentioned transmission lines of the second type U2, the central information line according to the invention. The transmission lines of the first and second types are each branched lines. For the purpose of understanding the invention one can proceed from the fact that the mentioned central information line comprises the segment of the transmission line U2 of the second type, proceeding between the central control unit ZS1 and the operating matrix control unit AS1, and of the transmission line U11 of the first type, the latter being looped to all individual apparatus of the operating matrix AF1. As will be explained in detail later with the aid of FIG. 2 the central information line proceeds in operating matrix control means AS1 over storage device as well as over connection devices. However, this is one peculiarity of the working example of the present invention and therefore of no essential importance for the latter. Each individual apparatus contains connection devices which are controllable by the operating matrix control means. For this, if the requirement for a connection exists in the individual apparatus, a connection impulse is given therefrom to the identified operating matrix control means which leads to the transmission of an order to effect connection to the individual apparatus in question.

The coupling switching devices of several operating matrices in one location form a single common switching matrix, which is divided, only for reasons which have no causal connection with the grouping of the switching matrix (for example reliability, expansion possibilities, and questions of traffic load) into several applicability areas having several operating matrix control means.

The switching matrix formed from the coupling switching devices in coupling stages A, B and C of operating matrices AF1 to AF11 corresponds in its development to that which is the principal object of British Pat. No. 1,058,893. This switching matrix as shown therein is developed of couplers in several (preferably three) coupling stages, connected over intermediate lines to the inputs of the first coupling stage. Subscriber lines, connection lines and all inputs and outputs of switching devices necessary for connection establishment and connection supervision for each connection, are similarly connected. Outputs of the couplers of the first until the next to the last coupling stage which are connected individually to the inputs of the couplers of the coupling stage switched subsequently in each case, are connectible in each case in pairs in this subsequent coupling stage. Such a switching matrix is shown and described in the above referenced British patent.

The special characteristic of the development of such a known switching matrix resides, according to the above identified British patent in the fact that from one switching matrix input the outputs of each of the couplers can be reached over one single connection path at the most. Thereby during pathfinding from the direction of a switching matrix input, through selection of one of these outputs, the path to be switched through over the switching matrix for the desired connection is already clearly fixed. The switching matrix, viewed from its inputs to the outputs of its couplers, is developed in purely fan-shaped fashion. Nevertheless, two switching matrix inputs can alternatively be connected over different paths because there are always accessible, from the direction of the two switching matrix inputs, several common coupler outputs, or several time two coupler outputs each, pertaining to the last coupling stage in different operating matrices and connected over one intermediate line each.

The operating matrices, for example AF1, thus possess three coupling stages each, the couplers whereof are connected over intermediate lines in such a way that to one coupler output each in the first to the next to the last coupling stage A and B, one coupler input each in the second to the last coupling stage B and C is individually fixedly assigned. The outputs of the couplers of coupling stage C in all operating matrices AF1 to AF11 and AFF are at least partially disconnected. In operating matrices AF1 to AF11 a part of these outputs is individually connected in pairs over intermediate lines ZLC leading from one operating matrix to another.

To the two central control means ZS1 and ZS2 arranged next to each other there are respectively assigned program storage means PS1 and PS2. The central control means reads from the program storage means according to which program comprising information transmitted by an operating matrix control means to be processed is received in the central control means. In addition, a common multi-part information storage means ZJS is assigned to the two central control means, the entire storage capacity whereof is available to the two central control means according to the needs in each case.

To the network of transmission lines U2 there is assigned input-output apparatus FS for the input and output of information by which central control means ZS1 and ZS2 can be reached directly. For this purpose, any conventional means such as a teleprinter may be used. It is possible through apparatus FS to check the mode of functioning of the central control means and change the storage contents of program storage means PS1 and PS2 (take out of storage and/or store).

There is further assigned to the network of transmission lines U2, an operating matrix control mechanism ASE, which, in case of a disturbance in one of the operating matrix control means AF1 to AF2, can be connected temporarily thereto as a substitute for it. Thus, the operating matrix control means are uniform among one another and can be exchanged for one another.

FIG. 2 gives further details of an operating matrix control means (AS1) shown in FIG. 1. The operating matrix control means is in connection, over transmission lines of the first type, for example U11, with individual apparatus, for example control system ST1 of coupling group KG1, and over transmission lines of the second type (U2) with the central control means shown in FIG. 1. The operating matrix control means can be requested by individual members, for example coupling group control ST1. With the aid of identification device Jd, the operating matrix control means is in a position to select one from several simultaneously present connection impulses, which are actuated over request contacts such as contacts an, and transmits a corresponding order to connect to the connection relay Mo which corresponds to the connection impulse in question.

The request circuits are connected individually to the operating matrix control means from each individual apparatus. However, it is also possible to provide request contacts, such as the one designated an of the individual apparatus ST1 in a coordinate matrix. Thereby, the number of request circuits may be reduced substantially and, in the most favorable instance, to twice the square root of the number of individual apparatus served by an operating matrix control means.

The connection relays, such as Mo, of the individual apparatus are located in a control matrix extending over all individual apparatus.

With the aid of contact mo, of connection relay Mo, transmission switching device S and receiving switching device E of switching matrix control means ST1 are switched effective. It is pointed out that there are a plurality of transmission switching devices s and receiving switching devices E of coupling group control means ST1, and that information applied to and from the latter is transmitted over transmission line U11 using a parallel code. This means that the transmission lines connected to transmission switching device s and receiving switching device E are of a multi-conductor type. The entire information to be transmitted in each case simultaneously appears in the conductors of multi-conductor transmission line U11.

The transmission lines of the first type, for example U11, do not extend over long distances. Further, relatively inexpensive transmission and receiving switching devices can be inserted because these, utilizing the parallel code transmission method, fully satisfy the speed requirements for the information transmission. Therefore, the relatively large number of circuits of the transmission lines of the first type, as well as the transmision and receiving switching devices for connection and transmission, do not present unfavorably high switching and other technical expenses. In the present case the receiving and transmitting switching devices comprise electromagnetic relays, or contacts thereof. However, it is also possible to substitute other equivalent switching devices therefor.

Preparatory to the description of the mode of operation of the operating matrix control means some definitions of terms will be given. As already evident from the above explanation, information is transmitted from the individual apparatus to the central control means, as well as from the central control means to the individual apparatus. In any case, the operating matrix control means serves as an intermediate member. Information transmission from one individual member to the central control means is subsequently always designated as "reading." The reverse information transmission from the central control means to an individual apparatus is always designated as "writing." Accordingly, the criteria "reading" and "writing" are formed in the operating matrix control means.

The "reading" signal is always formed in the operating matrix control means if a request by an individual member, for example coupling group control means ST1, is present over request contact an, and if all switching processes preceding functional programs are terminated. However, if no such request by an individual member is present, the "writing" signal is formed in the operating matrix control means which expresses the readiness of the operating matrix control means to receive information which may be present in the central control means and is to be transmitted to the said operating matrix control means.

Moreover, it can also be the case that neither a request by an individual member is present, nor that the operating matrix control means is ready to receive information. This operational state exists in the case when an operating matrix control means has not yet completed processing certain information. The operating matrix control means is thus not ready for any kind of information exchange with the central control means. A "block" signal is then formed in the operating matrix control means.

As is evident from FIG. 1, and as has already been described, two central control means are provided. Accordingly transmission lines of the second type such as U2 are also provided in duplicate. Further, systems and circuits which serve to transmit information are also in part provided twofold in the operating matrix control means. For reasons of simplicity this is not shown in FIG. 2. Further, at different locations comparison arrangements (not shown) are provided. It is thereby possible to supervise the accuracy of information transmission and processing. Furthermore, it can be assured, in simple manner, that upon the occurrence of a disturbance at any point of the central information transmission paths, operation of the exchange installation can still be continued. As these advantages of duplicating central parts are known per se, this duplication is shown in the working example only at some points. The foregoing are wellknown expedients in the telecommunications art.

A common transmission line U2 is connected from central control means ZS1 to all operating matrix control means. It scans cyclically and in succession, all operating matrix control means to determine in each case whether a "reading," "writing" or "block" signal is present. For this purpose each operating matrix control means has a connection system GA. An address receiver AE is assigned to this connection system GA. In order that, during scanning of the operating matrix control means by the central control means, always only one single operating matrix control means is connected, each connection is effected by the transmission of the address corresponding to the operating matrix control means in question from the central control means. (Under no circumstances should this address be confused with the addresses of the individual apparatus described in detail later.)

This address transmission from the central control means to an operating matrix control means for temporary connection of the latter to transmission line U2 can be carried out in different ways. It is possible to assign a separate address line to transmission line U2. The central control means transmits, for the duration required for connection, the address of the operating matrix control means in question. The beginning and end of the connection is determined in simple manner through the beginning and end of the address transmission over the address line.

It is also possible to transmit the address of the operating matrix control means in question which is to be connected to or disconnected from transmission line U2 over the latter. The address receiver of each operating matrix control means must thereby the permanently connected to transmission line U2. The connection and disconnection of the operating matrix control means through its connection system GA in this case is always caused, from the direction of the central control means, through the fact that the address of the operating matrix control means in question is transmitted with an additional "connect" or "disconnect" signal on the transmission line U2 from the direction of the central control means to all operating matrix control mechanisms. This connection guarantees that the addresses with the additional signal in each case will not be confused with the remaining information to be transmitted over the transmission line U2, because only the connection system of the operating matrix control means in question reacts thereto in the desired manner.

If the connection or disconnection of an operating matrix control means to or from transmission line U2 is caused by the central control means, only the address receiver of the operating matrix control means in question reacts and opens or closes the coincidence gates, G16, G17, G18 and G19, of connection system GA.

The signals "reading," "writing" and "block" are formed in program control AB of the operating matrix control means. The "reading" signal is transmitted over output L of program control AB, and the "writing" signal over output S of the program control. The "block" signal results from the fact that the "reading" and "writing" signals are transmitted at the same time. It is, however, also possible to identify the block signals by the absence of "reading" and "writing" signals, or to provide a third signal circuit therefor.

The "reading," "writing" and "block" signals are offered to the central control means. When the central control means causes, over connection system GA, the connection of an operating matrix control means to transmission line U2, it always receives one of these three signals. For the transmission of these signals, special signal lines can be assigned to transmission line U2. However, it is also possible to offer these signals to the central control means over transmission line U2.

There is also shown in FIG. 2 one of the two end apparatuses D of a data transmission path. As is evident from FIG. 1, it is possible to remotely control operating matrix control means such as AFF from the direction of the central control means. In this case, it is suitable to include into the branch of transmission line U2 leading to a remotely controlled operating matrix control means a data transmission path, the end apparatuses (data transmitters and receivers) whereof are D1 and D1' in FIG. 1. These are merely conventional data transmitters and receivers. The mode of operation of data transmission lines in itself is not the object of the invention and for this reason is not described in any further detail. Such devices are known in the art, and it is contemplated that any of the known devices may be used.

If in an operating matrix control means the "writing" signal is present, there is thus transmitted a corresponding signal to the central control means as soon as the latter causes, in the already described manner, the connection of the operating matrix control means over the connection system GA thereof. If the central control means has stored in its information storage means information to be transmitted to the operating matrix control means in question, it then carries out the transmission of such information to the said operating matrix control means in a manner described in more detail hereafter. However, if no such information is present, the central control means causes again in the manner described disconnection of the operating matrix control means from transmission line U2 by its connection system GA.

However, if in an operating matrix control means the "block" signal is present, when the central control means causes the connection of this operating matrix control means, the central control means causes in the manner described, the disconnection of the operating matrix control means in question, independently from the fact as to whether or not information to be transmitted from the central control means to the operating matrix control means is present.

However, if the "reading" signal is present in an operating matrix control means, it is also transmitted over gates G15 and G17 upon connection of the operating matrix control means to the central control means. There upon the central control means returns a signal to the operating matrix control means which initiates transmission of the information in question from the operating matrix control means over transmission line U2 to the central control means. The information is transmitted in several segments. Each information segment is separately initiated and acknowledged by special signals. This and the transmission of information in segments will be explained hereafter in more detail.

Each information is subdivided into several information segments. All information is preferably coded in binary code, i.e., the information transmitted over transmission lines U11 and U2, as well as the information temporarily stored in the operating matrix control means and recoded. Recoding in the operating matrix control means is for adapting information transmission on transmission lines of the first type, for example U11 in parallel code, to information transmission on the transmission line of the second type, U2, in series code. That is, a parallel to series conversion takes place. The information is transmitted on transmission lines of the first type with the aid of electromagnetic relays and on the transmission line of the second type with the aid of electronic switching devices, for example transistors. The high operating speed of the latter not only serves to decrease the transmission time on central transmission line U2 of the second type, but also makes possible information transmission in the mentioned series code, by reason of which only a few transmission channels are required. In contrast, over transmission lines of the first type, information is transmitted over multi-conductor lines. As these extend only over relatively short distances, and pose no high costs in their multi-conductor construction due to information transmission by means of parallel code, suitable transmission times can also be achieved with electromagnetic relays, or equivalent switching devices that are favorably inexpensive.

Further, as transmission lines of the second type extend over relatively long distances, with the aid of a data transmission path, for example one encompassing the radius of a large city or of a junction exchange office area, series code transmission operating slower compared to parallel code transmission can be employed for information transmission due to the use of electronic transmission and receiving switching devices because the switching time of the latter is smaller by a factor of from four to five orders of magnitude than that of electromechanical relays. This permits limiting the cost of transmission lines U2.

It has already been explained that the information is subdivided into several information segments, the transmission whereof is carried out in segments over the transmission line U2 of the second type with the aid of controlling signals.

All subscriber information is transmitted simultaneously over the multi-conductor transmission line U11 to the operating matrix control means. Information storage means JS comprises a separate part for each of four information segments: JS1, JS2, JS3, and JS4. Further, command storage means BS provides a separate part for each of the four information segments: BS1, BS2, BS3, and BS4. The different designation of information storage means JS and command storage means BS also indicates that in one case the central control means has "readable" information, and in the other case "writable" commands. These definitions are retained in subsequent portions of the specification.

For transmission on transmission line U2, each information transmission consisting of several information segments, and each command consisting of several command segments is supplemented by a length specification and an address. (These are the addresses of individual apparatus; they should not be confused with the addresses of the operating matrix control means.)

Prior to an information or command transmission, the length data are first transmitted. It indicates the quantitative extent of the subsequently transmitted information or of the command. If the total contents thereof can be expressed by less than four information or command segments, the information or command transmission is limited to fewer information or command segments. Due to prior receipt of prior length data, the receiver in each case, i.e., the operating matrix control means or the central control means knows when the information or command transmission will be completed.

In addition, each such transmission is preceded by an address indication. These are the addresses designating the individual apparatus, which must not be confused with the operating matrix control unit addresses. In such a transmission there is thus always previously indicated by the address from which individual apparatus an information emanates or for which individual apparatus a command is intended.

It has already been explained that each operating matrix, for example AF1 embraces several types each of individual apparatus, which are all in connection with the thereto assigned operating matrix control means over the corresponding transmission line of the first type U11. These individual apparatus of the different types include among other coupling controls, for example ST1; connection sets, for example VS1; relay connection sets, for example RS1; dial receivers WS1, and the like; they are provided several times each. The addresses of these individual apparatus of different types are arranged into address groups, each of which corresponds to one of the different types of individual apparatus. Thus, it is recognizable from the group to which an address pertains, of which specific type a certain individual apparatus is. As will be explained in detail below, the central control unit is able, upon the receipt of information and with the aid of the added address, first to store both together and to further evaluate the information in continued reference to the address, and secondly, to see from the address, with the aid of its evaluator AW1, of which type the individual apparatus is from which the information originates, i.e., of which type the message which was transmitted by the information is. The address group ascertained by the central control unit thus to an extent represents the key with which a specific message is ascertained from an ambiguous information.

Further, an address indication precedes each such transmission. Thus, it is always specified beforehand from which individual apparatus an information emanates or for which individual apparatus a command is intended.

It has already been explained that information transmitted is divided into several information segments, with the largest number of such segments being limited to four. The address data immediately preceding the information segments on transmission line U2 may additionally comprise segments, the largest number thereof being limited to two. The length data preceding the address data maximally comprises one segment in the present working example.

The length data, the address data and the maximum of four information or command segments are temporarily stored in equally large groups of binary code elements in the operating matrix control means and recoded and transmitted therefrom or thereto; this recoding can be limited to a conversion from parallel to series code or vice versa, and can, together with the intermediate storage form a single common process. The mentioned group of binary code elements is designated a byte. A first byte containing the data concerning length, a second and a third byte concerning the address data, and according to the present working example a maximum of four further bytes containing information or commands in each case jointly from a "word." The transmission of a word over transmission line U2 is controlled with the aid of auxiliary signals. These auxiliary signals are "reading" (L), "writing" (S), "block" (L+S), as already described, and "acknowledged" (Q).

It has already been indicated in what manner information to be read by the central control means is transmitted from an individual member, for example switching matrix control means ST1 to the operating matrix control means in FIG. 2. A request over request contact an precedes this transmission. Thereupon, this request is identified with the aid of identification means Jd. The result thereof is the address of the individual apparatus ST1. This address is maintained available by identification means Jd for transmission to code converter CU1. It also excites, over a coordinate control matrix, connection relay Mo assigned to individual member ST1. With the aid of contact mo of the latter, transmission switching device s, as well as receiving switching device E of the individual apparatus ST1 are switched effective. Over a plurality of circuits of transmission line U11, the entire information present in the individual apparatus is offered, simultaneously, for example in a parallel code transmission process, to information storage means JS of the operating matrix control means. The information is received in partial storage means JS1 to JS4 of information storage means JS, whereupon the coupling group control means ST1 is again disconnected through release of relay Mo in question.

The information is divided, corresponding to storing in partial storage means JS1 to JS4 of the information storage means, into several bits. Together with the information there is also present the quantitative extent thereof in information storage means JS. The length data is offered to one of the two inputs of gate G4. The individual bits stored in information storage means JS are offered to one input each of gates G5, G6, G7 and G8. Gates G4 to G8 symbolically express here that the information placed at one of their inputs, mentioned in each case, can only be conveyed on when a corresponding signal is placed, in each case over the other input of the gate, for transmission. This signal is connected by distributor V, with the aid of its switching arm v, successively to the different gates G1 to G12, so that successively the individual bits can be transmitted; i.e., first the data as to length, then the address and then the information or the command.

Figure 4A:
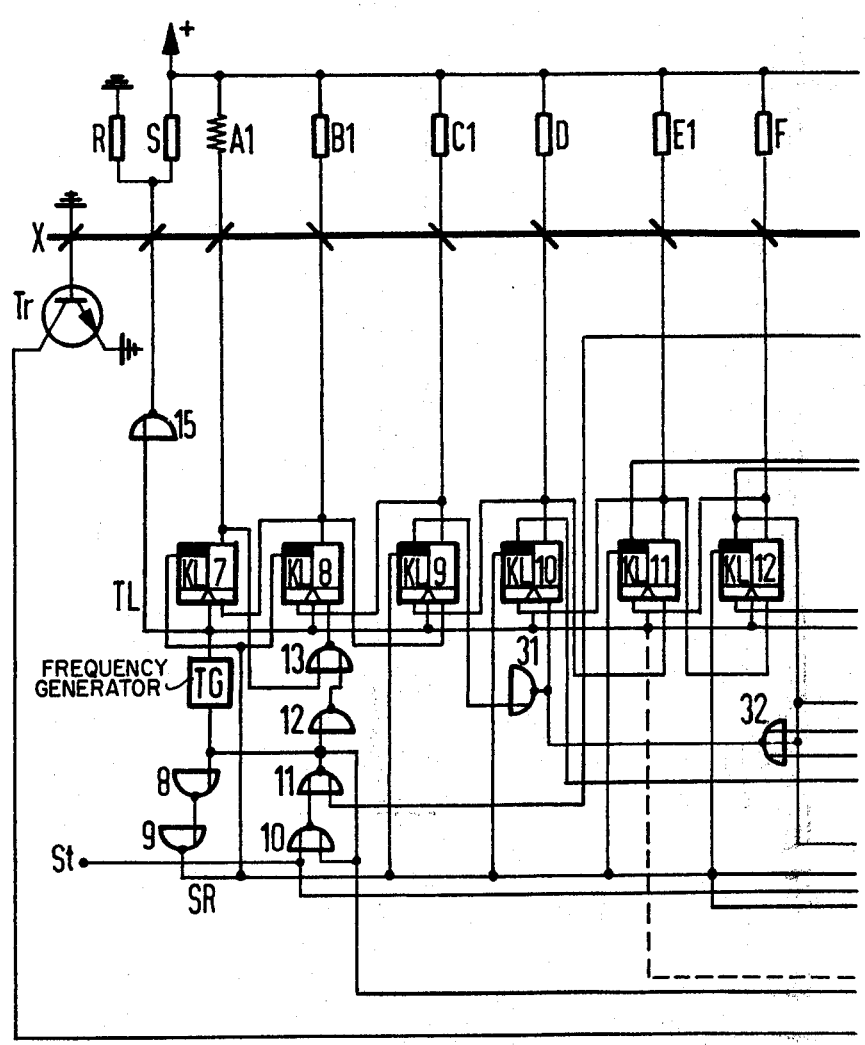
FIG. 4 consisting of FIGS. 4a and 4b taken together, is a schematic diagram of the internal circuitry of the program control in the FIG. 1 embodiment.
Figure 4B:
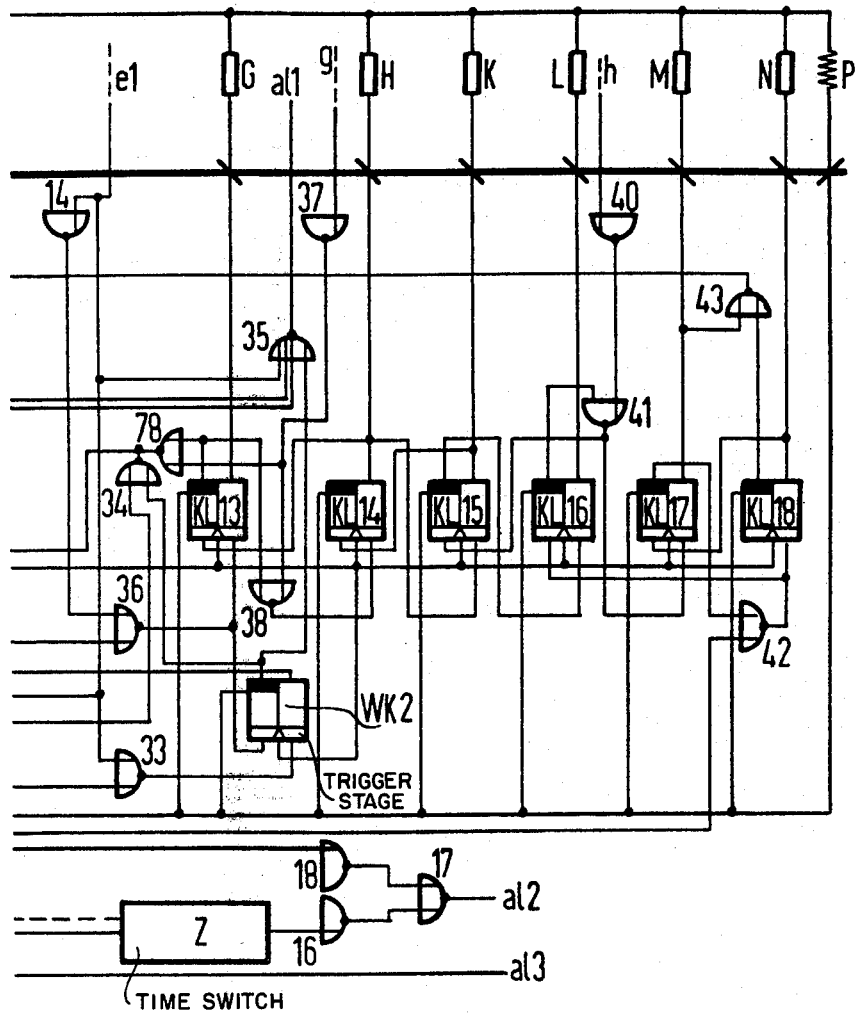

Before the further details of the switching arrangement according to FIG. 2, are explained, the program control AB will be described in detail. An exemplary construction of program control AB is illustrated in FIGS. 4a and 4b. A program control of the illustrated type comprises in its basic structure of a shift register formed from bi-stable trigger stages KL7 through KL18. Therebeyond, the program control utilizes ordinary gating circuits. The program control is further contains a time switching member Z with which the time requirements of the program control for each cycle of operation are monitored. A current measuring device is assigned to the operating control, which monitors the consumption of current of the trigger stages during a cycle of operation of the program control. This current measuring device comprises principally the transistor Tr and the magnetic core X, which has a hysterisis loop exhibiting a square characteristic. The switching devices B1 through N, which may be diode switches, are under the switching influence of the program control all having the same internal resistance. They lie at plus voltage which in the usual manner is brought in over supply lines to each of the switching devices under the switching influence of the program control. At some of the switching devices B1 through N switching commands solely are given off. A receipt of the previously given switching command will be received by some of these switching devices; namely, the switching devices E1, G and H. The circuits e1, g and h serve to indicate receipt of such a switching command.

The gate circuits used in the program control are all NOR gates. The voltage potentials arising in the represented principal circuits are ground potential and positive potential. The switching commands will be given off by the trigger stages KL8 through KL18 in the form of ground potential to the switching devices B1 through N. All trigger stages are beatcontrolled in the known manner. A beat generator TG delivers beat impulses over a beat line TL, common to all trigger stages. Each of the trigger stages has a rest position and a working position. The rest position will be designated in the following as "position 0" and the working position as "position 1". The position 0 and the position 1 each corresponds on each of the trigger stages to a preparation input. If ground potential is switched on at the preparation input of a trigger stage corresponding to position 0 early enough in the time between two beat impulses, then the trigger stage triggers to position 0, if is previously had taken position 1; otherwise, it remains in the position 0. The same holds for the position 1 of each of the trigger stages, which also are constructed completely symetrically. Each of the trigger stages has a corresponding output for the position 0 and one for the position 1. Depending on which of the two positions a trigger stage is in, ground potential is switched on to the output for the given stage by the trigger stage. The trigger stages have further an input for return position. These last mentioned inputs of all trigger stages are connected with the line SR for return. As long as the program control is at rest, plus potential is switched on over the output gate 9 onto the line SR. This potential has the effect that all trigger stages take the position 0.

The gate switches designated only with numbers give off plus potential over their outputs insofar as ground potential is applied to one or more of their inputs. They give off ground potential over their outputs only when plus potential is switched to all of their inputs. If different potentials from the outputs of different gates, for example 31 and 32, meet at a switching point, then the ground potential always prevails.

A control operation is described below. A start impulse in the form of ground potential will be given off over the terminal St on to the program control. The gate 10, on the two inputs of which a plus potential had existed and on the outputs of which consequently, ground potential had existed, now gives instead plus potential to the gate 11. Because the trigger stage KL18 takes the position 0, ground potential reaches one of the inputs of the gate 43, which as a result, gives off plus potential over its output to gate 11. This gate receives, then, plus potential over both of its inputs, so that it applies ground potential to its output. This ground potential reaches the other input of the gate 10. With the switching off of the input side of the terminal St, the two gates 10 and 11 retain their last given switching position. The ground potential given off from the gate 11 reaches further to the beat generator TG, which will be caused thereby to give off beat impulses over the beat line TL, common to all trigger stages. The mentioned ground potential reaches therebeyond, to the inputs of the gate 8, at whose outputs plus potential now appears in place of ground potential. As a result, ground potential appears at the output of the gate 9, which, as is not shown in detail, is an output gate, consequently, having a relatively large switching output (switching power), whereby all of the trigger stages will be set in position 0. The mentioned ground potential at the outputs of the gate 11 reaches finally also to the gate 12, at whose output the ground potential which until then had been applied there, will thereby be replaced by plus potential. Because plus potential had also been applied at gate 13 from the trigger stage KL7, ground potential now appears at its output in place of plus potential.

Through the above described switching process, the trigger KL8 is prepared to trigger from its position 0 to its position 1 at the next beat impulse. When this arrives over the beat line TL, ground potential will be switched on over its position 1 output to the switching device B1, as well as to the 1 input of the trigger stage KL7. Thereby the switching device B1 is the first to receive a switching command. During the period between the previous and the following beat impulse at the given inputs of the trigger stages KL7 and KL9 corresponding to position 1, these trigger stages will be prepared to switch to their position 1 at the occurrence of said following beat impulse. As soon as this beat impulse arrives, ground potential will be consequently switched on to the outputs of the trigger stages KL7 and KL9 corresponding to position 1. Thereby, circuits will be switched on over the resistance A1 and the switching device C1. The ground potential at the outputs of the trigger stage KL7 corresponding to the position 1, reaches further to the gate 13, which heretofore had received plus potential over its two inputs, and consequently, had given off ground potential over its outputs to the input of the trigger stage KL8, corresponding to position 1. Now, instead, it gives off plus potential.

The trigger stage KL8 receives from now on, instead of over its 1 inputs, ground potential over its 0 input from the output of the trigger stage KL9 corresponding to position 1. The trigger stage KL8 is thereby prepared to trigger once again to its position 0 at the occurrence of the next beat impulse. The trigger stage KL7 in contrast remains in its position 1, until the entire program control returns to its rest position, where as will be described later in detail, plus potential will be switched on to the lines SR. With the event that the trigger stage KL9 has taken its position 1 as described, the ground potential which until then had been applied at the single input of the gate 31, was exchanged for plus potential. Consequently, the plus potential which until then had existed at the output of the gate 31 was replaced by ground potential. This prepared the trigger stage KL10 to trigger to its position 1 during said next beat impulse. When this heat impulse arrives, the trigger stage KL8 triggers back to its position 0, while in contrast the trigger stage KL10 triggers to its position 1. Thereby, the commands to the switching device B1 will be switched off, and instead, a command to the switching device D will be switched on. The command given to the switching device C remains switched on. The ground potential switched on to the output of the trigger stage KL10 corresponding to position 1 reaches the input of the trigger stage KL9 corresponding to position 0 and the input of the trigger stage KL11 corresponding to position 1. These two trigger stages are thereby prepared to trigger to their last named positions during the next beat impulse.

The two trigger stages KL9 and KL11 trigger during the next beat impulse to their last named positions. Therewith, the switching command given to the switching device C1 will be ended, and a switching command will be switched onto the switching device E1. The switching command given to the switching device D continues. Because the trigger stage KL9 triggers back to its position 0, ground potential will be given off over its output corresponding to this position, which ground potential goes to gate 31. As a result thereof, it changes its output signal from ground potential to plus voltage. The ground potential given off over the outputs of the trigger stage KL11 corresponding to stage 1 reaches not only to the switching device E1 as a switching command, but also to the input corresponding to position 0 of the trigger stage KL10, as well as, to the input of the same corresponding to position 1 of the trigger stage KL12. Thereby, the trigger stage KL10 will be triggered to its position 0 and the trigger stage KL12 will be triggered to its position 1 at the occurrence of the next beat impulse in the described manner. The switching command given to the switching device D will be ended therewith and a switching command will be given off to the switching device F.

The further switching processes can now proceed further in two ways, depending on whether or not a receipt signal is given over the circuit e1. This receipt signal will be given by the switching device E1 when the switching command previously given over the trigger stage KL11 has been received in the switching device E1 and carried out. This receipt signal can also pertain to the two switching commands received by the switching devices D and E1. The receipt signal is positive, when ground potential is applied in a manner not shown over the circuit e1; in contrast, it is negative when plus potential is applied. Before the pertinent switching command is carried out - or the pertinent switching commands are carried out - plus potential lies at the input of the gate 14, and consequently, ground lies at its output. The former reaches the gates 32, 33 and 35. In addition, before the trigger stage KL12 has taken its position 1, ground potential reaches the three named gates over others of their inputs, so that they give off plus potential over their outputs.

Next the case will be considered in which switching device E1, after receiving the switching command given to it, carries out the command without delay and transmits back to the program control a positive receipt signal over the circuit e1. This can occur in the beat period immediately before or after the described triggering of the trigger stage KL12. As previously explained, this receipt signal consists of the switching on of ground potential instead of plus potential over the circuit e1. This ground potential reaches the gates 32, 33 and 35. The ground potential applied to the circuit e1 as a positive receipt signal reaches, in addition, the inputs of the gate 14, at the output of which plus potential now appears in place of ground potential. The latter plus potential reaches an input of gate 36. If now, as described, the trigger stage KL12 triggers from its position 0 to its position 1, plus potential will appear in place of ground potential at its output corresponding to position 0. Therewith, plus potential lies at both inputs of the gate 36 and consequently, ground potential lies at its output. This reaches the input of the trigger stage KL13 corresponding to position 1. Further, it is to be noted that the ground potential from the ground output of the trigger stage KL12 corresponding to position 1 reaches the input of the trigger stage KL11 corresponding to position 0.

When the next beat impulses now arrives over the beat line TL, the trigger stage KL11 will be triggered to its position 0, and the trigger stage KL12 will be triggered to its position 1. The switching command given off to the switching device E1 will be thereby ended, and a switching command will be given off to the switching device G. The ground potential given off by the gate 36 reaches, in addition, the input of the trigger stage WK2 corresponding to position 0. Because this trigger stage already is in the position 0, the last named potential can accomplish nothing in this case. Further, because ground potential is applied to one of the inputs of each of the gates 32, 33 and 35 over the circuit e1, plus potential lies on the outputs of the three named gates, and this plus potential releases no switching process.

The case will be considered in which the switching command given to the switching device E1 is not carried out in order thereby (by the switching device). Thus, no positive receipt signal arrives over the circuit e1, but rather, ground potential remains thereafter switched to this circuit. This leads, as will be hereafter described, to the result that the switching commands given off to the switching devices D, E1 and F will be repeated a single time, and insofar as the expected receipt signal still remains on the circuit e1, an alarm signal will be given off over the gate 35 to the circuit al1.

We will now proceed from the assumption that the trigger stages KL7 and KL12 have taken their position 1 and that a positive potential remains switched on to the circuit e. The latter will be transformed to ground potential by gate 14. The latter potential reaches among other things, the gate 36, at the other input of which a positive potential is applied from the trigger stage KL12. Consequently, plus potential is also applied thereafter, at the output of the gate 36 as before, so that the trigger stage KL13 cannot trigger as previously described, from its position 0 to its position 1, at the occurrence of the next following beat impulse. The plus potential from the circuit e1 reaches the gates 32 and 33. Because the trigger stage KL12 is triggered from its position 0 to its position 1, plus potential is applied to its output corresponding to position 0, instead of ground potential. Thereby, plus potential is applied to both inputs of the gate 33 and to all three inputs of the gate 32 (trigger stage WK2 is not yet triggered from its position 0 to its position 1), so that ground potential appears from then on at their outputs instead of plus potential. Thereby, the trigger stages KL10 and WK2 will be prepared to trigger from their position 0 to their position 1 at the occurrence of the next following beat impulse. At the occurence of the same beat impulse the trigger stage KL11 triggers back from its position 1 to its position 0. Thereby, the switching command given off to the switching device E1 will be switched off, and the switching command to the switching device D will be switched on for the second time. Because with the exception of the trigger stage KL12, the two trigger stages KL10 and WK2 now take their position 1, plus potential lies at the two inputs of the gate 34, and ground potential lies at its output. This ground potential reaches the input corresponding to the position 0 of the trigger stage KL12. Further, the ground potential from the output corresponding to the position 1 of the trigger stage KL10 is applied to the 1 input of the trigger stage KL11. At the occurrence of the next beat impulse, the trigger stage KL12 will, consequently, be triggered to its position 0 and the trigger stage KL11 will, consequently, be triggered to its position 1. Thereby, the switching command given off to the switching device F will be ended, and the switching command to the switching device E1 will be switched on for the second time. At the occurrence of the following beat impulse, the trigger stage KL10 triggers back to its position 0, and the trigger stage KL12 triggers to its position 1, as described. Thereby, the switching command given off for the second time to the switching device D will be ended, and the switching command to the switching device F will be switched on for the second time.

The special development of the described switching arrangement proceeds from the assumption that the switching commands given off for the first time to the switching device E may have been lose because of some unfavorable spurious condition. It is assumed that these conditions occur relatively infrequently and do not result from an error arising in the switching arrangement, but rather from a short time disturbance. Insofar as the loss of the switching command does pertain to such a disturbance, it is to be expected that the disturbance will not arise again when the switching command is given the second time, because it is very unlikely that the same disturbing influence which arises very seldom, will occur twice by chance successively and concurrently with the heat impulse. It is, however, assumed that when the switching command given off twice to the switching device E1, in addition to the one switching command to the switching command to the switching device D the one switching command to the switching device F is not received over the circuit e1 in the described manner. In such case a switching error has arisen in the program control.

It is now assumed that this receipt signal also remains outstanding in this case. The trigger stages KL11 and KL12 have taken their position 1. The trigger stage WK2 is also to be found in its position 1, whereby, it is recorded that a one-time repetition of the switching commands given off to the switching devices E, E1 and F has taken place. A positive potential will be applied from the three last named trigger stages to the three corresponding inputs of the gate 35.

Because, as a consequence of the fact that the receipt signal expected over the circuit e1 remains outstanding, a plus potential remains on the circuit e1. This causes a plus potential to occur at all of the inputs of the gate 35, as soon as the trigger stage KL12 is triggered, as described, from its position 0 to its position 1. As a consequence thereof, at this point of the switching process, the plus potential which until then had been applied to the outputs of the gate 35 will be exchanged for ground potential. This change in potential releases an alarm signal over the circuit all, which indicates, that the control operation was interrupted because the receipt signal which confirms the carrying out of a switching command or of switching commands has remained outstanding over the circuit e1. Therewith, the further release of commands will also be interrupted, as will be explained hereafter.

As soon as the trigger stage KL12 is triggered from its position 0 to its position 1, plus potential lies also at both inputs of the gate 33 and, consequently, ground potential lies at its output. This achieves, however, nothing in the trigger stage WK2, because this stage is already triggered to its position 1. In the same way plus potential lies also at two of the three inputs of gate 32; however, ground potential from the output of the trigger stage WK2 corresponding to position 1 lies at the third input of gate 32. Thereby, the plus potential at the output of gate 32 cannot be switched for ground potential at this point in the switching. The switching commands for the switching devices D, E1 and F cannot, therefore, be repeated.

By disconnecting the output corresponding to position 1 of the trigger stage WK2 and the one input of the gate 32, it can be achieved in the presence of an error, that the switching commands for the switching device D, E1 and F are continually repeated in the previously described manner. For this case it is provided that over the circuit all a subsequent evaluation of these switching commands in the switching devices D, E1 and F will be cut off. Because the trigger stages KL10, KL11 and KL12 trigger in a continually repeating cycle, the error which has arisen can be easily determined with the assistance of known measuring devices, for example an oscillograph.

In contrast to the previously described processes, we now proceed from the assumption that after a one time repetition of a switching command to the switching devices D, E1, the expected receipt signal arrives over the circuit e1, which consists, as described, of a switch from plus potential to ground potential. The latter reaches, among other things, to an input of the gate 35 and prevents there the giving off of the alarm signal over the circuit all at the triggering of the trigger stage KL12 from its position 0 to its position 1. The ground potential reaches, in addition, the gates 32 and 33 and prevents the ground potential from being given off by these gates over their outputs. The receipt signal given in the form of ground potential over the circuit e1 reaches also to the gate 14 and is transformed, by gate 14, into plus potential, which is given to gate 36. As soon as the trigger stage KL12 triggers from its position 0 to its position 1, plus potential appears at the trigger stage KL12 output corresponding to position 0 in place of ground potential, which plus potential also reaches the gate 36. At the gate 36 output, as a consequence, the plus potential applied there until then will be switched to ground potential. This reaches the inputs of the trigger stage WK2 corresponding to position 0 and to the input of the trigger stage KL13, corresponding to position 1. When the next beat impulse now arrives, the trigger stage KL13 triggers from its position 0 to its position 1, and the trigger stage WK2 triggers from its position 1 to its position 0. In the same way the trigger stage KL11 triggers from its position 1 to its position 0, as already described. A switching command will now be given off to the switching device G.

The reaction time of the switching device G is, as a rule, smaller than the time difference between two beat impulses; it can, however, in exceptional cases, be even larger. Therefore, the further continuation of the switching of the program control is brought into switching dependence on a receipt signal on the side of the switching device G.

It is, however, in contrast to the above explanations, also possible to utilize the circuit g as well as the circuit h, to bring the release of the series of commands given by the program control, additionally into switching dependence on external criteria. If one proceeds from the assumption that an external signal should influence the release of commands over the circuit g, then the giving off of the switching commands for the switching devices H through N must depend on the event that said signals previously arrives over the circuit g. Through appropriate supplementation of the present switching arrangement, it is also easily possible for the professional to bring the continuation of the release of commands into switching dependence on external signals at chosen points of the operation control.

Because the trigger stage KL13 is triggered from its position 0 to its position 1, plus potential from its output corresponding to position 0 lies at the gates 78 and 38. If one or more beat impulses arrive over the beat line TL before the receipt signal, or external signal, has arrived over the circuit g, on which until then plus potential exists then ground potential from the outputs of gate 37 lies at the other inputs of the gates 78 and 38. At the two outputs (the outputs of gates 78 and 38) there occurrs thereafter plus potential as it did before, which leaves the trigger stages KL12 and KL14 uninfluenced. As soon as the receipt signal (ground potential), which is expected over the circuit g, arrives, plus potential will be applied from gate 37 to the inputs of the gates 78 and 38 in place of ground potential, so that these gates, for their part, apply ground potential on the one hand to the input corresponding to position 0 of the trigger stage KL12 and on the other hand to the input corresponding to position 1 of the trigger stage KL14. These two trigger stages are thereby prepared for a reaction to the next beat impulse. As soon as this beat impulse arrives, the trigger stage KL12 triggers from its position 1 to its position 0, and the trigger stage KL14 triggers from its position 0 to its position 1. The switching command given off to the switching device F will be thereby ended, and a switching command will be given off to the switching device.

The further continued switching of the trigger stages occurs in the same manner as has been described already for the trigger stages KL10/KL11 and KL11/KL12. If the two trigger stages KL15 and KL16 have taken their position 1, then the next beat impulse and also further beat impulses can become functional, when a receipt signal or, as previously described with reference to circuit g, an external switching signal appears over the circuit h. The switching device H must also have reacted to the switching command given to it before a switching command may be given off to the switching device M. If now a beat impulse arrives, before the receipt signal expected over the circuit h, is present, then ground potential lies once again thereafter, as it did before, at the output of the gate 40. In spite of the fact that plus potential from the output corresponding to position 0 of the trigger stage KL16 is applied to an input of gate 41, no ground potential can appear immediately thereafter at its output, because at its input connected with the output of gate 40, ground potential is still applied. As soon as, however, the receipt signal in the form of ground potential in place of plus potential arrives over the circuit h, then also at the output of the gate 41, the plus potential, which has until then been applied there, will be switched for ground potential, which reaches the trigger stages KL15 and KL17. The former triggers to its position 0 and the latter triggers to its position 1. A switching command given off to the switching device K will thereby be ended and a switching command to the switching device M will be given off.

The plus potential released from the output of the trigger stage KL17 corresponding to position 0 (in place of ground potential) reaches an input of gate 42. From the output of gate 42 ground potential for the preparation on the one hand for the return positioning of the trigger stage KL16 from the position 1 to the position 0 and on the other hand, for the engagement of the trigger stage KL18 from its position 0 in the position 1 can then be given off, when a start signal received over the terminal in the form of ground potential is ended. Until then, further arriving beat impulses can achieve nothing at the trigger stages KL16 and KL18. However, as soon as the start signal is ended, the trigger stage KL16 will be triggered into position 0, and the trigger stage KL18 will be triggered to its position 1. Therewith, the switching command given off to the switching device L will be ended, and a switching command will be given to the switching device N. This last mentioned switching command is the last of the switching commands. It represents the programming command.

The ground potential switched on over the output of the trigger stage KL18 corresponding to position 1, reaches the inputs of the trigger stage KL17, corresponding to position 0. As soon as the next beat impulse arrives, the last named trigger stage triggers back to its position 0. From there on plus potential reaches both inputs of gate 43. As a consequence thereof, gate 43 gives off ground potential over its output, which reaches an input of the gate 11. The ground potential lying at the output of the gate 11 during the previously described switching processes will be switched to plus potential. This plus potential reaches an input of gate 10, on the output of which ground potential appears in place of plus potential. The last given switching condition of the gate 11 will be retained, as a consequence thereof, independently of gate 43. The input of the gate 11 connected with the output of the gate 10 will once again be brought under the switching influence of the terminal St, over which a next start signal can be received. The plus potential given off over the output of the gate 11 at the last mentioned point in time of the switching process reaches, in addition, the input of the gate 12, at the output of which the plus potential, which until then had been applied there, will be switched to ground potential. Thereby, the plus potential will be made to remain at the output of gate 13 until the arrival of the next start signal. In spite of the fact, as will be hereafter described, that the trigger stage KL7 triggers back from its position 1 to its position 0, over its (KL7) output corresponding to the position 1, plus potential reaches the other input of gate 13.

The plus potential given off from the gate 11 reaches further to the gate 8, which as a result, gives off to the gate 9, which is connected thereto, ground potential. The gate 9, constructed as an output gate (power gate), now gives off over its output plus potential in place of ground potential to the line SR. This line is provided for the return of all trigger stages to their position 0. As soon as plus potential is applied to it (line SR), as described, the trigger stages KL7 and KL18, which at this point of the switching still had taken the position 1, trigger back to their position 0. Therewith, the current flowing over the resistance A1 and the current flowing over the switching device N will be switched off. Further, the current flowing over the resistance B will be switched off, as soon as the ground potential at the outputs of the gate 9 is switched to plus potential.

Upon the termination of operation of the program control AB, the ground potential, which was heretofore applied to the output of gate 11 will be switched to a positive potential, and the beat generator TG will be switched off, which ends its transmission of beat impulses over the beat line TL.

The program control AB has been described in detail hereinabove in conjunction with FIGS. 4a and 4b, and it is now necessary to correlate that description with the diagrammatic representation in FIG. 2.

As was explained with reference to the FIGS. 4a and 4b, a series of switching devices are activated by the program control shown herein, which switching devices are designated with the letters B1 through N. Further, the switching arrangement shown in the FIGS. 4a and 4b has a terminal St, over which the aforementioned switching arrangement receives a start impulse, whereby the cycle of a control operation will be commenced.

The program control shown in the FIGS. 4a and 4b operates as described above to perform the necessary control operations for either reading or writing. Hereafter, reference will be made to a reading operation. The description given below for a reading process is equally applicable to writing, so that the process for writing need not be described as well. The program control according to FIGS. 4a and 4b for reading is connected in FIG. 2 with the similarly designated connections. The control operation for reading (information transmission from the individual apparatus to the central control unit) is commenced by a signal introduced over the coincidence gate G20 (FIG. 2) so that (a). an identification and switching on process (see above) is effected, (b). an information is present in storage in the information memory JS, (c). the central control unit has brought about the switching of the pertinent operating matrix control unit on to the transmission line U2 of the second type (over AE in FIG. 2) and (d). the "write" signal is not present in program control AB in FIG. 2.

The program control AB shown in FIG. 2 has, in addition, a bi-stable trigger stage L for the formation of the read signal and a second bi-stable trigger stage S for the formation of the write signal. These two bi-stable trigger stages, which may be of conventional construction, have a common return device, not designated, having an input M. The two bi-stable trigger stages have inputs E1 and G. Each of these two trigger stages react as follows: If it receives a signal over its given input, for example E1, then it gives off a signal corresponding to the stage function, for example, read. If a signal is given off over the input M, then the read and-/or write signal will be erased.

The program control AB, shown in FIG. 2, has in addition, two connections H and h, over which it is connected with the distributor V. If the operating control AB gives a signal to the distributor V over the connection H, then the switching arm v will be advanced by one step over its winding W in the previously described manner. The advancement of one step will be indicated over the connection h to the operation control AB by the distributor V with the assistance of the contact w.

In the following detailed plan, the control operation during the process of reading will be given.

1. Identification process ended (Jd); length indication present (JS); switching on of the operating matrix control unit carried out on the part of the central control unit; write signal(s) is not present.
2. Program control produces signal on E1.
3. Trigger stage L gives off the read signal (over G15, G17 and U2 to the central control unit).
4. Central control unit receives read signal.
5. Central control unit reads (JS, G4, G13, G18 and U2) the length indication.
6. Central control unit transmits back receipt signal (over U2, G16, G21 and Q).
7. Program control AB (compare FIGS. 4a and 4b) transmits signal to switching device G.
8. Program control AB (FIG. 2) forms the write signal and supplements the previous read signal to the common block signal.
9. Central control unit receives (over G15, G17 and U2) block signal.
10. Central control unit ends receipt signal.
11. Operation control AB transmits the signal over connection H, i.e., the further switching impulse for the distributor V.
12. Distributor V receipts the switching advance over contact w and connection h.
13. The program control according to FIGS. 4a and 4b returns to its beginning position; the cycle begins anew at 1.

Distributor V is controlled by program control AB. From this program control the "writing" signal (S) is offered, in rest position, to the central control means over gates G15 and G17. As has already been explained, this means with respect to the central control means that the operating matrix control means is ready to receive a command from the central control means. However, if the operating matrix control means was requested by one of the individual apparatus, then as soon as the length data and the address and information are present, stored and ready to be transmitted in the operating matrix control means, corresponding signals are transmitted to program control AB which causes it to offer the "reading" signal over gates G15 and G17 to the central control means. If this causes, in its connection cycle, the connection system GA of the operating matrix control means in question to connect this to transmission line U2, the central control means receives first the "reading" signal (L) of the individual apparatus in question. Thus, the central control means is to receive information from the just connected operating matrix control means. As soon as the central control means is ready to receive, through connection to a free storage line in the central information storage means ZJS, it receives the length data, which is already offered by the operating matrix control means on transmission line U2. It is pointed out here that gate G4 of the operating matrix control means was already enabled or opened for transmission of the length data as soon as the program control AB had ascertained that the length data and the address and information segments were present, stored, and ready for transmission in the operating control means. Thus, the length data is already present on transmission line U2 when the central control means has caused connection of the operating matrix control means with the aid of connection system GA.

The central control means receives the length data transmitted from the operating matrix control means over transmission line U2. As soon as it has received it, it transmits the "acknowledged" signal (Q) over transmission line U2 or over a separate signal line to the operating matrix control means. This signal arrives in program control AB at terminal Q. Thereupon, program control AB transmits, in the already described manner, the "block" signal to the central control means.

At this time, the program control AB transmits an advance pulse to distributor V. This switches the distributor switching arm v forward by one step. Thereby, gate G4 is blocked for transmission of the length data, and gate G1 is enabled or opened for transmission of the address from identification means JD to code converter CU1. As soon as this switching forward is completed, the program control AB disconnects the "block" signal and connects the "reading" signal. This causes the central control means to receive the address data conveyed over gates G1, G13 and G18 on to transmission line U2. The central control unit additionally evaluates the address of the individual apparatus with the aid of its evaluator AW1. This evaluator does not receive and process the address in its total information content, but only determines to which group of individual apparatus the individual apparatus designated by the received address pertains. With the aid of evaluator AW1 the central control unit ZS1 ascertains as to whether the individual apparatus in each case is a coupling group control, for example, ST1; a connection set, for example VS1; a relay set, for example RS1; a dial set, for example WS1; or the like. Depending on this group assignment the central control unit ZS1 is able to recognize the nature of the message contained in the subsequently received information, and in what specific manner it must evaluate this ambiguous information. As soon as this has taken place, the central control means transmits over the transmission line U2 an acknowledgement through open gate G16 to program control AB. The central control means has received the address. As has already been explained, the address can be transmitted in the form of one or two bytes.

Referring to FIG. 3, a byte word (in the sense of the above given definition) is comprised of a byte containing the length indication, which gives the length of the information to be received in the central control device ZS1 over the transmission line further bytes which contain the address of the given individual apparatus, and a maximum of four additional bytes for the actual information. A shift register SR is provided in the central control device ZS1 for each byte, and is illustrated in FIG. 3 as a part bounded by heavy lines. Each such part has a multiplicity of storage elements, the exact number of which is not important to this description. Each of these parts bounded by heavy lines of the shift register SR serves to receive one byte.

A word received in the shift register SR will have prefixed to it, in a manner not shown in detail, the address designating the given operating matrix control device. After reception of a word, its parts are taken up in the corresponding parts of the shift register, SR, according to the labeling in FIG. 3. A word received in the shift register SR will, as well, be passed on to the central information memory ZJS. At this point, a part of the address of the individual apparatus, and indeed, that part which designates the address group and which designates the given address of the individual apparatus, i.e., its special type, will be evaluated therewith for deriving the pertinent information. FIG. 3 shows, with reference to the wiring of the inputs of the coincidence gates Gt1 and Gt2, that two identical data signals given off by the shift register SR, because of different addresses indicating type, arrive at different individual apparatus as distinguishable information over the outputs of the two coincident gates. The inputs of the coincidence gates Gt1 and Gt2 are, respectively, connected to a combination of the same outputs of those storage elements of the shift register SR, which receive the information bits of the given word. Further inputs of the coincidence gates Gt1 and Gt2 are, respectively, connected to two different combinations of outputs of those storage elements of the shift register, which receives the parts of the address of the individual apparatus which designates, the address group, i.e., the special type of the given individual apparatus. With the transmission of a word from the shift register SR to the central information memory ZJS the address of the operating matrix control device, the length indication, and the entire address of the individual apparatus will be written unchanged in a memory row of the central information memory. With the transmission of the pertinent information of the given word from the shift register to the central information memory the origin of this information will, however, be evaluated therewith. Identical data signals will be evaluated using the coincidence gates Gt1 and Gt2 as different pieces information, according to which type of individual apparatus an information came from. Thus, the central control unit is able to interpret information signals by analyzing the address from which that information came.

The information segments are transmitted in the same manner after the address, in the form of further bytes from the operating matrix control means towards the central control means. The length data was stored previously in distributor V. Therefore, the regular end of information transmission can be determined in the operating matrix control means. As the length data was transmitted to the central control means, the same is also true for the central control means.

After receipt of the last information segment of a word, the central control means returns for the last time the "acknowledged" signal to the program control of the operating matrix control means. Due to the transmission of the length data in the beginning, the quantitative extent of the information to be transmitted was stored in the operating matrix control means, as well as in the central control means. It is possible in a simple manner to supervise the proper course of information transmission. If after transmission of one of the information segments, no acknowledgement signal is transmitted from the central control means to the operating matrix control means, the latter sounds an alarm in a manner not shown after a predetermined time period has elapsed. An alarm is also sounded if the central control means, instead of the expected "reading" signal, recieves the "writing" or "block" signal without having already received the number of information segments which was indicated by the length data. In one of the two preceding cases the central control means requested insufficient information, and in the other case insufficient information was offered to the central control means.

Commands are transmitted from the central control means to operating matrix control means in the same manner as information. It has already been outlined that an operating matrix control means which is ready to receive commands keeps available the "writing" signal at gate G17 over gate G15. As soon as the central control means causes, in the manner already described, over connection system GA, the operating matrix control means to connect to transmission line U2, it receives the "writing" signal (S). It is assumed that it has stored a command destined for the operating matrix control means. The central control means now transmits over gate G16, the acknowledgment signal (Q) to program control AB of the operating matrix control means. The program control AB, as a consequence, causes in a manner not shown, over destributor V, gate G3 to be switched open to pass the first byte expected from the central control means over gates G19 and G14. This first byte again contains the length data which is received by distributor V and stored. It thereby knows after how many switchings forward of its switching arm v the command transmission is concluded.

As soon as the program control AB has received the "acknowledged" signal, it disconnects the "writing" signal. First, the operating matrix control means processes the length data; thereupon, it conveys an advance pulse to distributor V, which as a consequence thereof, switches its switching arm v forward by one step. Thereupon, the program control AB again connects the "writing" signal. The last mentioned signal causes the central control means to now transmit the address of that individual apparatus for which the subsequent information is intended, instead of the length data, over the transmission line U2 to the operating matrix control means. In addition, the central control means transmits the "acknowledged" signal to program control AB of the operating matrix control means whereupon this, in a manner not shown, causes over distributor V gate G2 to be switched open to pass the second byte expected from the central control means over gates G19 and G14. This byte which contains the address of that individual apparatus for which the subsequent information is intended or a portion thereof is received over code converter CU2 and transmitted over gate G2 to identification means Id. It is thereby converted by code converter CU2. Identification means Jd causes over the coordinate control matrix the connection of the connection relay, for example Mo, of that individual apparatus (ST1) designated by the address.

There are now successively received in the same manner, with the aid of the "writing" and "acknowledgement" signals the bytes containing the command to be transmitted. These are passed over gates G9 to G12 and received in partial storage means BS1, BS2, BS3 and BS4 of command storage means BS, and stored therein temporarily. Thereafter, the central control means causes in the already described manner, the operating matrix control means in question to again be disconnected by connection system GA from transmission line U2.

The command stored in command storage means BS is transmitted over a plurality of circuits of transmission line U11, in a parellel code transmission, to receiving switching devices E of individual apparatus ST1, Relay E represents one of many receiving relays provided.

The code converter CU1 or CU2 for a byte pertaining to information or command, in each case containing the address, comprises in conjunction with identification means Jd the storage and code conversion system previously mentioned. With regard to the further bytes of a word which contains the information or the command, information storage means JS or command storage means BS represents this storage and code conversion system. The recoding can be limited to a conversion parallel-series code and vice versa, and can form together with the intermediate storage a single common process. Code converters CU1 and CU2 contain on their sides facing connection system GA, conventional electronic transmission and receiving switching devices. The same is true for information storage means JS and command storage means BS.

The preferred embodiment of the invention described hereinabove is only exemplary of the principles of the invention. The scope of the invention is defined by the appended claims, and it is anticipated that many modifications and changes to the preferred embodiment will be within the ambit of the claims.

We claim:

1. A circuit arrangement for telecommunication installations wherein different types of messages, the type being a function of the origin of the message, are transmitted between a central control means and individual apparatuses, comprising:

transmission line means connecting said central control and said individual apparatuses for information exchange, said individual apparatuses being formed into groups of like type, means associated with each said group of individual apparatuses for transmitting over said line means address information particularized to that group, indicating the identity of the group, and thereby the type of apparatus in that group, said individual apparatuses otherwise being operative to transmit information signals of like characteristics, a plurality of connection control means interposed in said transmission line means between said individual apparatuses and said central control means, each of said connection control means being connected to a plurality of individual apparatuses, each said connection control means including means for selecting one of a plurality of information signals received from the respective individual apparatuses connected thereto and for effecting a connection of the individual apparatus causing the transmission of the selected information signal to said transmission line means, said connection control means further including means for determining the address of an individual apparatus upon the production of an information signal from said individual apparatus and for transmitting said address jointly with the information to be transmitted to said central control means and means in said central control means for evaluating said information signals and said address information and for interpreting said evaluated information signals in accordance with the result of the evaluation of said address information.

2. The circuit arrangement defined in claim 1 wherein said connection control means includes transmission switching devices for information and addresses, respectively, and said central control means includes receiving switching devices for information and addresses, respectively.

3. The circuit arrangement defined in claim 4 wherein said central control means includes means for evaluating received address information for determining from which of the type groups of individual apparatuses a received signal was issued.

* * * * *